Patented Nov. 18, 1930

1,782,353

UNITED STATES PATENT OFFICE.

ALPHONS O. JAEGER AND JOHANN A. BERTSCH, OF ST. LOUIS, MISSOURI; SAID JAEGER ASSIGNOR TO THE SELDEN COMPANY, OF PITTSBURGH, PENNSYLVANIA, A CORPORATION OF DELAWARE

ZEOLITE

No Drawing. Application filed April 6, 1926. Serial No. 100,116.

This invention relates to novel base exchange compounds or zeolites and to novel methods of preparing the same.

In the past, base exchange compounds, for the most part polysilicates, which are commonly known as zeolites, have been prepared in two general ways. Metal compounds have been caused to react with soluble silicates in solution and metal compounds and fusible silicates have been caused to react by fusing. The latter process is very expensive and requires careful supervision. It is, however, the only process known at the present time for introducing into the non-exchangeable nucleus of the zeolites, oxides which do not form the desired water soluble compounds. These very frequently also do not form easily fusible compounds and even when the fusion method is utilized, it has been necessary in the past to utilize various fluxing means, thereby introducing impurities into the mixture which are frequently difficult to remove even with long continued leaching.

It is one of the objects of the present invention to form zeolites containing elements in the non-exchangeable nucleus of the zeolite molecule which elements do not form the desired readily soluble simple compounds and which cannot, therefore, be introduced into zeolites by wet methods using their simple compounds. It is a further object of the invention to introduce elements into the non-exchangeable nucleus of the zeolite molecule by a new and improved wet method even though the elements form soluble simple compounds and are therefore capable of being introduced into zeolite molecules by wet methods, using soluble simple compounds of the elements. The present invention also contemplates preparing zeolites of a novel chemical composition by wet methods, and these new products are included and form part of the invention.

According to the present invention, zeolites are prepared by causing soluble silicates, such as, for example, alkalie metal silicates, to react with soluble complex compounds of elements which are to be introduced into the non-exchangeable nucleus of the zeolite or with soluble compounds of the bases of different valence from that desired in the zeolite.

Preferably the complex compounds should not be so completely dissociated as to form exclusively simple silicates which are not base exchange compounds. While it is a peculiar advantage of the present invention that by means of complex compounds of elements which do not form readily soluble simple compounds zeolites can be formed containing these elements in non-exchangeable form, the invention in its broader aspects is not limited to the formation of zeolites by means of complex compounds of such elements and the advantages of the present invention can also be applied to the formation of zeolites by the introduction of elements in the form of complex compounds which elements are also capable of forming readily soluble simple compounds. Other and further advantages of the present invention will appear from the more detailed description which follows.

The complex compounds may be of such a character that they are readily decomposed and set free the metal oxide or other base in a nascent state in order to form the zeolite. It is also possible to introduce complex compounds which are not decomposed during the reaction and which accordingly remain in the zeolite nucleus. These products which contain complex ions in non-exchangeable form in the zeolites are new chemical individuals and as new products are covered by the present invention apart from the process of producing them.

It is a further advantage of the present invention in some of its phases that many of the complex ions can be rendered soluble with a very much smaller amount of alkali than is necessary to dissolve up many of the metal oxides or hydroxides which have been introduced into zeolite nuclei by ordinary wet methods using simple compounds of the elements. For many purposes, such as for example, for use in certain catalytic reactions, zeolites should not contain much alkali and it is very easy by the present invention to produce zeolites which are substantialy free from alkaline metals or other strong alkalies and this constitutes an added advantage of the present invention.

A large number of complex compounds can be formed and among the complex ionogens which may be used in the present invention may be mentioned ammonia, hydrocyanic acid, sulfocyanic acid, oxalic acid, formic acid, tartaric acid, glycerine, various sugars, citric acid and many other organic and inorganic compounds. The decomposition of the complex ions may be brought about in many ways, for example, by heat, by neutralization with organic or inorganic acids, by oxidation with oxidizers such as hydrogen peroxide, nitric acid, chromic acid, various peroxides, permanganates, halogens, hydrochloric acid, ozone, ultra-violet light and the like. A combination of several of the above mentioned methods may also be used and is desirable in some cases. The removal of the complex ionogen may also take place by chemical transformation of the complex ion into more simple substances, for example, a cyanogen composition can be dissolved by the introduction of mercuric ion. Thus, potassium cuprocyanide can be broken up according to the following equations:

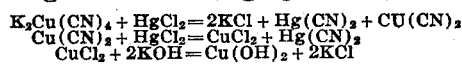

The process is, of course, in no sense limited to metal oxides, hydroxides, and carbonates, which are insoluble in aqueous alkalies or which are difficultly soluble. On the contrary, the process is generally applicable also to metals which form alkali soluble oxides, hydroxides and carbonates in so far as they are capable of yielding soluble complex compounds which can be easily decomposed under the conditions of a particular reaction or which are desirable complex compounds for permanent incorporation into the zeolite nucleus. Such metals are for example: aluminum, chromium, zinc, vanadium, beryllium; tin, palladium, rubidium, rhodium, osmium and platinum.

In every case, of course, the particular complex compounds chosen and the agents chosen for decomposing them, must be governed by the particular purposes to which the zeolite is to be put and in general no injurious substance should be introduced either by the complex compound itself or by the means taken to break it up. If, however, in some cases, it is necessary to introduce injurious substances, these substances should be of such a nature that they can be readily removed from the zeolite after formation by washing or by any other suitable method of purification.

A further modification of the invention consists in introducing components into the nucleus of the zeolite in the form of soluble compounds of valences different from that finally desired and reducing or oxidizing the compounds during or after the formation of the zeolite in order to obtain the desired valence or the desired mixtures of valences. For example, tetravalent manganese cannot readily be introduced directly into a zeolite by wet methods, but if a suitable amount of manganese in the form of potassium permanganate is simultaneously admixed with the other zeolite components and the mixture formed decomposed with hydrogen peroxide, the manganese will be reduced to a tetravalent stage and a zeolite can be precipitated by suitable salting out combined with vigorous stirring and heating to 60° C. The resultant product is a dark brown potassium manganous zeolite which contains tetravalent manganese in a non-exchangeable form. In a similar manner, chromium can be introduced as chromic acid or as a chromate and then reduced during the formation of the zeolite by means of suitable reducing agents as, for example, zinc dust, hydrogen, hydroxyl amine, powdered aluminum, powdered magnesium, powdered iron and other well known reducing metal powders or metal alloy powders. Organic reduction agents such as tartaric acid, citric acid, sugar, formaldehyde, formic acid and the like can also be used. Complex compounds which are in themselves reducing agents may also be employed such as, for example, complex oxalates, tartrates, formates, saccharates, cyanides, sulfocyanides, ferrocyanides, and the like. One or more elements may be introduced in the same manner or in different manners.

When metal compounds are introduced into zeolite nuclei by means of complex compounds or compounds of higher valence which are soluble, it is not necessary in all cases to completely decompose the complex compounds or completely reduce the soluble compounds of the higher valence. On the contrary, it is possible and frequently desirable to introduce elements into zeolite nuclei in the form of mixtures of various valences or of mixtures of the simple and complex metal compounds and this can be brought about by the partial decomposition of complex compounds present or by partial reduction of compounds of higher valences.

Complex compounds and compounds of other valences when desired sometimes themselves become components of a non-exchangeable nucleus of the actual zeolite and in other cases, zeolite formation does not actually take place until the complex compounds or the compounds of other valence than that desired are decomposed, reduced or oxidized, setting free the base in a nascent state. For example, when preparing a copper zeolite, containing copper in the nucleus, cuprammonium nitrate can be caused to react with ammoniacal water glass to produce a deep blue gel which is a true zeolite having base exchange power and which contains the complex cuprammonium ion in non-exchangeable form. When this body is dried, the ammonia is volatilized and a light green copper zeolite is produced which on suitable hydration exhibits base exchange powers.

The invention is, of course, not limited to the introduction of all the non-exchangeable components in the form of complex compounds of a valence different from that desired in the final zeolite. On the contrary, in addition to the elements introduced in the form of complex compounds some elements which form soluble alkali metal metallates may also be introduced in this form. A single element may also be introduced into the zeolite in one or more different forms, for example, partly as complex ions or compounds of valences other than that desired in the final zeolite and partly as alkali soluble oxides. Examples of elements which may be introduced by more than one method are chromium, aluminum, zinc, beryllium, palladium, ruthenium, arsenic, platinum and vanadium.

Zeolites prepared according to the present invention by means of complex ions of elements or compounds of different valence possess quite different properties from those prepared by usual methods. The physical structure is quite different, being much more voluminous and more permeable for gases, particularly where the decomposition of complex ions has taken place after the zeolite has been formed. As will be readily understood the volatilization of certain components of the zeolite such as, for example, ammonium or the cyanogen radical, increases the porosity of the zeolite to a marked extent. The contrast is most marked between zeolites of the present invention and similar zeolites prepared by fusion methods. When the products are to be used as catalysts, the difference in structure is of great importance. For example, when two copper zeolites of the same or substantially the same chemical composition, one prepared by fusing and the other by methods of the present invention involving the use of cuprammonium complex salts, are tested in the reduction of nitrobenzol vapor in a stream of hydrogen at 200° C., a very marked difference can be noted. Of course, both zeolites are given a preliminary reduction with hydrogen at 250° C. in the usual manner. The fused zeolite catalyst will produce 35–40 grams of anilin per 50 grams of copper per day and if this loading is considerably exceeded, the final product becomes impure and contains considerable amounts of unreacted nitrobenzol. On the other hand, the copper zeolite prepared by means of a cuprammonium complex salt, under the same conditions, gives a yield of 75–90 grams anilin per 50 grams copper per day and this loading can be increased temporarily up to 130 grams of anilin without contaminating the final product with nitrobenzol. The essential catalytic element in the above referred to zeolites is copper and presumably the very marked increase in effectiveness in the zeolite prepared by means of complex copper salts is due to the finer division of the copper throughout the framework of the zeolite and the more finely porous structure of the zeolite coupled with greater gas permeability. The invention is, however, not limited to any particular theory of action of the zeolites.

Zeolites of the present invention may contain any of the known exchangeable bases or combinations of two or more exchangeable bases. The introduction of these groups takes place in the usual manner by base exchange from solutions of their soluble salts. Among the elements which may be introduced as exchangeable bases are the following: lithium, potassium, sodium, copper, rubidium, caesium, silver, gold, beryllium, magnesium, calcium, zinc, strontium, cadmium, barium, mercury, radium, aluminum, scandium, gallium, yttrium, indium, ytterbium, thallium, titanium, zirconium, tin, lead, thorium, vanadium, arsenic, niobium, antimony, tantalum, bismuth, chromium, molybdenum, tellurium, tungsten, uranium, manganese, iron, cobalt, nickel, ruthenium, rhodium, palladium, osmium, iridium and platinum. These elements may be present as simple bases or in the form of complex ions. It should be noted that ammonium which behaves as an alkali metal can also be introduced and will be treated as an exchangeable base.

The nuclear acid component which in most common zeolites is $SiO_2$ can contain one or more other inorganic acids, the $SiO_2$ being partly or completely replaced thereby. Examples of acids which may be used are the acids of phosphorus, sulfur, nitrogen, tin, titanium, tungsten, chromium, niobium, tantalum, uranium, arsenic, antimony, manganese, etc. The choice of acid or acids to be introduced will depend in each case on the use to which the zeolite is to be put, thus in case of catalysts, an acid may be introduced which possesses the desired catalytic or activating effect or in the case of zeolites to be used as insecticides, insecticidal acids such as acids of arsenic may be employed.

The finished zeolites before or after introduction of exchangeable bases by base exchange can be transformed into a novel class of compounds by treatment with acids or compounds containing acid radicals which are capable of forming preferably difficultly soluble or insoluble bodies with the zeolite. In all probability, these compounds react mainly with the exchangeable bases as those acids which give preferably insoluble compounds with the zeolites as a whole correspond to the acids which give preferably insoluble or difficultly soluble compounds with the exchangeable bases in the free form. A large series of new compounds can be produced in this manner by the introduction of one or more acid radicals and for many purposes, the efficiency and value of the zeolite can be very greatly increased. For example, in catalyses in liquid or vapor phase, catalytic purification of gases, insecticides, pigment colors and the like, zeolites can be produced in combination with suitable acids to form salt-like bodies. These new bodies are different in many of their chemical reactions and presumably in their chemical structure from the original zeolites. The acid radical introduced forms ions and possesses characteristics which differ from those possessed by the same acid radical when introduced as a nuclear component and correspondingly forming a part of the zeolite nuclear complex.

The treatment of zeolites with compounds containing suitable acid radicals opens up a wide field for the introduction of a larger number of different chemical groups into the zeolite molecule and is of great importance for many uses to which the zeolite may be put, for example, when they are to form composite catalysts. In the case of catalytic zeolites, of course, the acids which are combined in dissociable form may advantageously be themselves catalysts or activators and in the case of many organic oxidations and sensitive catalytic reductions, such as for example, the reduction of oxides of carbon to oxygen containing compounds, very valuable and accurately controlled composite contact masses can thus be prepared. The choice of acid radicals which can be introduced in the form of dissociated compounds with the zeolite molecule is a very wide one and includes a large number of acids. For example, when the zeolite is to be used for catalytic purposes, acids or salts of the acids of the following elements may be used: vanadium, tungsten, uranium, chromium, molybdenum, manganese, tantalum, niobium, antimony, selenium, tellurium, arsenic, phosphorus, titanium, bismuth, aluminum, lead, tin, zinc, sulfur, chlorine, platinum, boron, zirconium, thorium. Corresponding polyacids and complex anions of these acids may be used and in certain cases are very desirable. In this manner, for example, complex anions such as ferro and ferricyanogen, sulfocyanogen, metal cyanogen complexes, metal ammonium complexes and the like can be introduced whenever they form preferably difficultly soluble compounds with the exchangeable bases present in the zeolite. Insecticidal preparations may also advantageously include the radicals of hydrocyanic acid, arsenic acid, phenolm and the like.

The acid radicals referred to can be introduced either singly or in mixtures, successively or simultaneously. The quantitative amounts of the acid radicals introduced can also be regulated so that the resulting compounds with the zeolites are of acid, basic or neutral character. The choice of the acid radicals which may be introduced, of course, depends on the use to which the zeolite is to be put and also is dependent in a large measure on the exchangeable bases which are present in the zeolite molecule. Thus, for example, certain acids which form soluble compounds with alkali metals may be introduced into zeolite molecules which contain alkaline earth metals as exchangeable bases or other bases to form with the acids relatively difficultly soluble bodies.

The zeolites of the present invention may be used for many purposes in the concentrated form of the pure zeolites, but for many purposes it is advantageous to dilute the zeolite with other bodies and in many cases, particularly when the zeolites are to be used as catalysts and for the absorption of gaseous, liquid or suspended bodies, new and very desirable results may be obtained by the use of suitable diluents. The choice of diluents depends, of course, on the uses to which the zeolite is to be put and a few classes of diluents will be mentioned as illustrative of bodies which may be used but the invention is not, of course, limited to the particular individual diluents described.

1. Diluents for use with zeolites in water softening and purifying include kieselguhrs of all kinds, especially cellites, fuller's earth, talc, pulverized natural or artificial zeolites, rocks, tuffs, trass and other rocks of volcanic origin, greensand, glauconite, slag wool, slags, cements, silica gel, quartz filter stones, powdered earthenware, manganese dioxide, pulverized carbon, various kinds of coke, charcoal, artificial carbon, lamp black, humus carbon, animal charcoal, sugar charcoal, and the like and in general any diluents can be used which increase the porosity and purifying power of zeolites. By means of these diluents the filtration speed through the zeolites can be very largely increased and the period of regeneration shortened.

2. Diluents to be used in zeolites for catalytic purposes include the diluents enumerated under class 1 and also, depending on the particular catalysis, fragments or powders of minerals and stones rich in quartz, particularly bodies having a particle size less than 60 microns. Other diluents are pumice meal, asbestos, mica flakes, powdered glass, graphite, powdered metals and alloys, compounds of minerals which contain activating or catalytical elements for the particular process, such as for example, metal oxides, suboxides, peroxides, hydroxides, carbonates, sulfates, difficultly soluble halides, nitrates, silicates, tungstates, uranates, chromates, vanadates, manganates, ferrates, molybdates, phosphates, aluminates, plumbates, and other compounds of metals which are difficultly soluble in water or alkali. Metallides, hydrides, carbides, silicides, sulfides, sulfites, nitrides, and organic compounds of catalytic elements which are insoluble in water or alkali can also be used. These compounds include, of course, insoluble ammonium complexes, radio active bodies and the like.

3. Zeolites used in the purification of gases or for gas absorption or separation may advantageously be mixed with one or more of the diluents which are included in classes 1 and 2 and in addition finely divided metals, metal oxides, and suboxides may be used which are capable of absorbing gases or forming with them chemical compounds. Examples of such metals are: platinum, palladium, nickel, cobalt, copper, iron, rhodium, ruthenium, osmium, iridium, chromium, magnesium, silver, aluminum.

In addition, oxidation agents such as oxides of chromium, molybdenum, uranium, manganese, vanadium etc., can be incorporated into the zeolites in a nascent state or mixed with the components of the zeolite or finally kneaded with the gelatinous zeolite precipitates. These diluents are particularly effective in the removal of contact poisons of all kinds from gases such as sulfur, selenium, tellurium, arsenic and their compounds as well as volatile metal compounds. An increase in efficiency can also be effected by the addition of colloidal metals, metal oxides, hydroxides, or carbonates, such as for example, iron oxide, silver oxide, zinc oxide, oxides or carbonates of the alkaline earth metals, chromium oxide and lead oxide.

4. Zeolites used for the adsorption of the solid bodies from suspensions or colloidal solutions may contain diluents which possess adsorptive powers and which may be either mixed with the zeolite or combined with it in a colloidal combination. The diluents listed under class 1 can be used as suitable diluents or additional colloids and further peat, substances rich in humins, soap like bodies, tannins, saponins, pulverized organic materials, such as cellulose, wool, cotton, wood flour, pulverized earthen ware, and in fact all kinds of protective colloids can be used.

The diluents may be introduced into the zeolite in many ways but usually it is desirable to introduce the diluents into the components of the zeolite before zeolite formation. This effects a very homogeneous mixture and an exceedingly fine and even division and distribution of the diluents throughout the zeolite structure. Such diluted zeolites can not be considered as purely mechanical mixtures but in many cases the intimate admixture and in some cases superficial silicification causes the mixture to behave as a homogeneous body and in many cases the components may in fact be present in chemical or colloidal combination. The dilution of zeolites is of particular importance in connection with certain colloidal bodies which do not possess sufficient mechanical strength for practical uses. When these bodies are embedded or incorporated into the framework of the zeolite, they are held in a rigid frame of high porosity and their effective surface is in no way diminished. In this manner, a coagulation or loss by dusting or colloidal solution of many of the finely divided bodies is prevented and in short, these bodies are transformed into a mechanically strong and useful form. It is an advantage of these products that they can be used in gas or liquid streams of high velocity without being destroyed.

Not only do diluent bodies incorporated into the zeolite structure retain their effective surface, but the peculiar opalescent, honeycomb-like structure of the zeolite itself permits gas and liquids to permeate freely and to reach the finely divided diluents incorporated in the zeolite without hindrance. The diluents which are embedded in a very fine and even state of division frequently show a greater efficiency and sometimes a different action than either the diluents alone or the zeolites alone. For example, highly porous bodies introduced into catalytically active zeolites may increase the effectiveness of catalysis for either the vapor or liquid phase by absorbing or adsorbing the reacting fluids and those bringing them into contact with the catalytically active components of the product in higher concentration than would otherwise be the case. This effect of absorption and adsorption may be due to the zeolite or to the diluent or both. Thus, an absorbent diluent can be incorporated into a catalytically active zeolite to increase its efficiency or a catalytically inactive zeolite can be used as a porous framework for catalytically active diluents. In some cases, a product may be classified under both of these headings and in all cases the result is an improved and more effective catalyst.

In many, if not most, cases, the zeolites constitute the dispersing agent, and the diluents, the dispersed phase. The invention is in no sense limited to this arrangement or structure and on the contrary, in some cases, new and improved results can be achieved when the zeolite represents the dispersed phase and the diluent body, the dispersing agent, and in a few cases, it may be desirable for the zeolite to be present partly in the dispersed phase and partly as dispersing agent. The invention covers all of the three possible combinations. When the zeolite is to be the dispersoid, very effective combinations can be obtained by introducing the zeolite into the pores of certain minerals or amorphous bodies of honeycomb, sponge or foam-like structure. Thus, for example, pumice, kieselguhr, volcanic rock, asbestos, unglazed porcelain, earthenware fragments, carbons of all kinds, such as artificial carbon, coke, activated carbon, animal charcoal, humous charcoal and the like, can be impregnated with the components of the zeolite and the latter formed in the pores of the solid body or, if desired, the zeolite immediately after formation, can be introduced by pressing, kneading or coating. It is frequently advantageous in incorporating the zeolite to evacuate the porous body in order to remove air from the pores before introducing the zeolite or the zeolite components. The impregnation of catalytically active zeolites into pumice, kieselguhr and the like is frequently of great advantage in certain catalyses such as the catalytic oxidation of organic compounds. A relative small amount of the zeolite is extended over an enormous surface and this frequently gives the same percentage yield per volume of contact mass as if the zeolite were present in concentrated form. The possibilities of dilution which may be accurately controlled in degree may frequently be desirable in the damping or moderating of catalysts and a careful and accurate control of catalytic power can be achieved by the use of diluted zeolites.

Diluents when added to the components of the zeolite before formation or to the zeolite immediately after formation are frequently of great advantage in rendering otherwise difficultly filterable precipitates readily filterable. Various grades of mechanical strength may be achieved by a suitable drying of the precipitates and washing, the drying taking place preferably at temperatures below 100° C. Where the zeolite is not sufficiently strong, washing may take place with a dilute water glass solution instead of with water. This effects a surface silicification and very markedly increase the mechanical strength of the product. Washing with waterglass is also of advantage in adjusting the alkalinity of the zeolite, particularly for certain catalytic uses where a high alkalinity is desirable.

Diluted zeolites in which the diluents and zeolites form a homogeneous whole are not claimed generally in this application, such zeolites forming the subject-matter of our co-pending application, Serial No. 95,771, filed March 18, 1926. In the present application diluted zeolites are only claimed in connection with the novel processes of manufacture of the present invention or when they contain complex cations in non-exchangeable form.

In general, the large number of possible variations in the composition of zeolites prepared according to the present invention makes it impossible to illustrate all of the modifications within the confines of a patent specification and it should be clearly understood that the specific examples which follow are to be taken as illustrative of certain types of products which can be produced by means of the present invention and in no sense limit the invention to the particular procedural steps or to the products therein set forth. On the other hand, however, many of the products described in the specific example are of particular advantage for certain purposes and while in its broader aspects the invention is not limited to details set forth in the specific examples, it does include as more specific features, separate compositions and procedural steps described in some of the examples.

The precipitation of zeolites even in the presence of diluents may frequently be very slow and in such cases it may be desirable to accelerate the precipitation by the addition of inorganic or organic acids in liquid or gaseous form. Examples of such acids are hydrochloric acid, sulfuric acid, carbonic acid, tartaric acid, citric acid and their acid salts. Ammonium salts, salts of the alkali metals, halogens, alcohols and organic materials such as phenols, creosote, chloral hydrate, glue and the like may be used. In some cases, it is also desirable to operate with physical means as temperature pressure in autoclaves, and by cathaphoresis.

For many purposes, such as for example some catalyses, it is desirable to treat the zeolites of the present invention with various reagents which may be oxidizing or reducing agents and which may effect secondary chemical changes in the zeolite particularly at the surface. A similar secondary chemical change may take place during catalysis as a result of the reaction and it should be clearly understood that when the term "zeolite" is referred to in the claims, we do not desire to limit this expression to zeolites which have undergone no chemical change and on the contrary, we include zeolites which either by preliminary treatment or as a result of reactions in which they are used, have sustained secondary chemical changes.

The zeolite structure lends itself to many advantageous modifications of catalytic processes and the advantages of this structure are not limited solely to mechanical strength and resistance to dusting, crumbling and the like which have been referred to above, but also make possible certain particular shapes and forms which are advantageous in many cases. Thus, for example, in water or gas purification and in many catalyses, it is desirable to form the zeolite into plates or other shapes which are to be readily mounted into the apparatus used. The high porosity and permeability of the zeolite structure for both gas and liquid makes it possible to use the zeolites in relatively thick and strong plates and this constitutes one of the advantages of the present invention. In certain catalyses, it may be very desirable to control the temperature in the catalyst either to distribute too great reaction heat or to maintain a sufficiently high temperature in the case of certain endothermic reactions. For this purpose, zeolites may be formed into relatively thick plates in which are embedded cooling or heating elements. Reinforcing elements such as wire mesh may also be embedded in zeolite plates and are advantageous for many purposes.

A further important use of the zeolites in many catalyses consists in coating the inner walls of catalytic apparatus with a layer of zeolites either diluted or undiluted. In catalyses where the materials of the apparatus walls or of piping may exert a deleterious effect on the reaction, the zeolite coating is of great importance in preventing such side reactions and at the same time protecting the apparatus walls from corrosion. Not only can the zeolites of the present invention be coated on the walls in the form of strong layers which protect the apparatus, but the catalytic process may be made more efficient as a whole where the zeolites chosen are catalysts for the particular reaction to be carried out. The invention will be described in greater detail in the following specific examples which are illustrative of certain embodiments of the invention and which in no sense limit its scope.

Example 1

1. 4 to 6 mols $SiO_2$ in the form of sodium silicate are diluted with 5 to 6 volumes of water and ammonia is added until the cloudiness which forms at first clears up.

2. 1 mol of copper nitrate is treated with ammonia until the precipitate which forms at first dissolves up again.

The deep blue solution #2 is poured into solution #1, stirred and heated to 60–80° C. The reaction mixture soon solidifies to a gel, and on further stirring is transformed into granular aggregates. The precipitate, which is of a light blue color is pressed, dried and can be formed into greenish blue fragments showing a conchoidal fracture. When treated with hot water these fragments break up into small granules. The copper of the product, which is a sodium copper zeolite, or a sodium-ammonium copper zeolite cannot be readily dissolved up in ammonia and the copper is present in a non-exchangeable form. The product, however, is capable of exchanging its sodium for other bases.

The granules can be treated at 250–300° C. with hydrogen containing gases and the reduced catalyst thus obtained gives excellent results in the reduction of aromatic nitro compounds to amines. Thus, for example, nitro benzol is easily reduced to aniline by means of hydrogen or purified watergas at temperatures between 180 and 260° C. In a similar manner, nitro naphthalene is reduced to naphthylamine. The same catalyst can be used in dehydrogenating cyclohexanol to cyclohexenone at 220–320° C. By means of the same catalyst, borneol is transformed into camphor at 280–300° C. and acetaldehyde and crotonaldehyde yield the corresponding alcohols at 80–180° C. The catalyst can also be used as chlorination catalyst for chlorinating methane at 220–400° C.

The efficiency and capacity of the catalyst can be very materially increased by introducing diluents such as kieselguhr, pumice meal, charcoal powder, finely divided pyrolusite and similar bodies which can be stirred into the waterglass or into the copper compound solution, or if desired, into the mixed solutions. Increased effectiveness of the catalyst in processes which involve the splitting off of water can be produced by exchanging the sodium partly or in whole for dehydrating agents such as aluminum, thorium and titanium and the like. Catalysts thus produced not only give better yields than the simple sodium copper zeolite but also result in purer products. This latter property is particularly desirable in the reduction of nitro bodies to the corresponding amines which are produced in a very pure state and remarkably free from deleterious colored impurities. Partial or total substitution of the exchangeable base by copper is also frequently advantageous.

Example 2

1. 4 to 6 mols of $SiO_2$ in the form of sodium silicate solution are diluted with 10 to 12 volumes of water, and ammonia is added until the cloudiness which forms at first disappears, whereupon a sufficient amount of kieselguhr, pumice meal, powdered carbon or powdered nickel ore is stirred in to thicken the mixture until it just remains readily stirrable.

2. 1 mol of nickel nitrate is dissolved in ammonia to form the nickel ammonium nitrate.

Suspension #1 is warmed to a temperature of 60–80° C. and solution #2 is stirred in. A firm gel forms promptly and on further stirring is transformed into small granules which are readily filterable. The quantitative yield can be improved by a gradual addition of nitric acid until the mixture just remains weakly alkaline to phenolphthalein. The product which precipitates out is a diluted sodium-nickel zeolite or sodium-ammonium-nickel zeolite which possesses good base exchanging powers. An increased mechanical strength can be effected by washing the product with a dilute waterglass solution or a dilute solution of sodium aluminate.

The zeolite produced in the above example is useful for many purposes, particularly as a catalyst. Thus, it forms, when reduced at about 300° C., an excellent reduction catalyst for the hydrogenation of liquid or gaseous compounds with hydrogen or hydrogen containing gases. For example, acetone vapors and vapors of other ketones can be reduced by the aid of the zeolite catalyst to the corresponding alcohols at 100–120° C. in the presence of hydrogen. Similarly, phenol can be hydrogenated at 220–260° C. to cyclohexanol, naphthalene at 180–220° C. to tetraline, acetaldehyde at 220° C. to ethyl-alcohol and crotonaldehyde at 80–180° C. butyl alcohol.

By pulverizing the diluted sodium-nickel zeolite and reducing with hydrogen at 300° C., an excellent contact is produced for the hardening of fats and hydrogenation of amines and nitro-compounds. The contact has the great advantage that it is not pyrophoric. The same contact is also excellent for the liquid phase reduction of ketones, phenols, aldehydes and hydrocarbons, and is suitable in these reactions where hydrogen is used under high presure. For example, liquid phase reductions can be carried out by coating the pulverized catalyst onto granular carriers such as pumice, diatomaceous stones, earthenware fragments, metal granules and the like, using waterglass or organic adhesives as cementing agents. A very effective method of carrying out the catalysis consists in causing the liquids, or dissolved or suspended substances to trickle over the catalyst in the presence of hydrogen. The composite contact mass described above is also very suitable for vapor phase catalyses.

In an analogous manner, other zeolites can be produced which are highly effective as reduction and hydrogenation catalysts. These products are made by exchanging the exchangeable bases of the zeolite for dehydrating groups such as aluminum, thorium, titanium, chromium, beryllium, zicronium, vanadium and zinc compounds. After base exchange has been effected, the zeolites may be treated with salts of acids of tungsten, chromium, molybdeum or vanadium in order to form salt-like compounds with the zeolite.

Example 3

1. 1 mol of ammonium vanadate is treated with sulfur dioxide in aqueous suspension and at an elevated temperature until it is transformed into the water soluble greenish-blue vanadyl salt, whereupon the excess $SO_2$ is removed by boiling.

2. 1 mol of copper sulfate is treated in aqueous solution with sufficient ammonia to form the deep blue cuprammonium sulfate solution.

3. 10 mols $SiO_2$ in the form of ammonical, sodium or potassium waterglass are diluted with 10 volumes of water and celite or pumice meal is stirred into the solution until the suspension formed remains just stirrable.

Solutions 1 and 2 are poured simultaneously into 3 with violent agitation and the mixture is heated to 65° C. Dilute sulfuric acid can be cautiously added until the solution just remains weakly alkaline in order to accelerate the precipitation, and to increase the yield. The dark precipitate, which is first gelatinous and then becomes granular, is pressed, thoroughly washed and dried, and constitutes a sodium - ammonium - copper vanadyl zeolite.

The product is hydrated in the usual manner and the alkali metal is exchanged for iron by means of an iron chloride solution. The excess iron chloride is washed out and the product treated with a sodium molybdate solution forming the molybdate of the iron-vanadyl-copper zeolite diluted with celite or pumice. The product can be transformed into an excellent oxidation catalyst by treatment with air and $SO_2$ at 400° C. The resulting catalyst gives excellent yields in the catalytic oxidation of anthrancene to anthraquinons by means of air at 300–370° C. and is also a good catalyst for the oxidation of methane to formaldehyde by means of air at 400°–450° C.

The alkali metal of the vanadyl-copper zeolite can also be substituted by silver and if desired subjected to a subsequent treatment with compounds of molybdic or tungstic acid to produce the molybdic or tungstate of the silver-vanadyl-copper zeolite. After treatment with oxidizing acid gases at 400°–500° C., the product is an excellent catalyst for the oxidation of naphthalene to phthalic anhydride by means of air by 350°–450° C. The catalyst also gives splendid results in the oxidation of alcohol vapors with air to produce aldehydes and acids and in a similar manner ethylene chlorhydrine can be oxidized with air in the presence of steam at 300°–390° C. to chloracetic acid.

Example 4

1. 16 mols of $SiO_2$ in the form of a 2N ammoniacal waterglass solution are formed into a thin paste with precipitated pyrolusite.

2. 1 mol of aluminum oxide is dissolved in the form of sodium aluminate.

3. 1 mol of copper oxide is dissolved in aqueous ammonia to form cuprammonium hydroxide.

4. 1 mol of zinc oxide in the form of ammoniacal zinc oxide solution.

5. 1 mol of chromium in the form of chromium nitrate is brought into solution by means of alkali forming a chromite.

Solutions 2, 3 and 5 are poured into solution 1 and the mixture is gently warmed with vigorous agitation to 60°–70° C. whereupon solution 4 is introduced in a thin stream, the whole mass solidifying to a blue green gel. The gelatinous precipitate is poured off, dried below 100° C. and then hydrated by permitting water to trickle over it. The body obtained possesses excellent base exchange powers and is a fine catalyst for the cracking of crude petroleum, being characterized by a very slight tendency to form carbon and by the fact that it is very easily regenerated by steam.

Example 5

1. 14–18 mols $SiO_2$ in the form of potassium water glass are diluted with ten volumes of water and fine asbestos fibres are stirred into the solution to form a thinly fluid solution.

2. 0.5 mol ferrous nitrate is treated with potassium acetate until the solution is neutral and of a reddish yellow color. Glycerine is then added until a sample of the solution does not give a green precipitate with N/10 caustic potash but, on the contrary, assumes an olive green color. The whole solution is then treated with 1/6 mol of caustic potash.

3. 1 mol of chromium is dissolved in the form of potassium chromite.

4. 1 mol of zinc oxide is dissolved as zinc ammonium oxide.

5. Sufficient permanganate is dissolved in water to oxidize all of the glycerine and the ferrous iron.

6. 1 mol of beryllium nitrate is dissolved to form the sodium beryllate.

Solutions 2, 3 and 6 are added to suspension 1, heated to 60° C. and the permanganate solution is permitted to flow in with violent agitation. The ammoniacal zinc solution is added to the mixture before a gelatinous body has precipitated. Thereupon the mixture solidifies to a firm gelatinous mass which is advantageously warmed and stirred for a considerable period of time. The precipitate is then pressed and forms a dark brown zeolite containing chromium, zinc, manganese, iron and beryllium in the nucleus. The product is dried, hydrated, and a dilute barium nitrate solution is permitted to trickle over it until a portion of the potassium is exchanged for barium. This product is then treated with a neutral ammonium chromate solution to form the chromate of the zeolite.

The final product can be reduced with hydrogen or hydrogen containing gases at 300° C. and forms an excellent catalyst for the reduction of oxides of carbon by means of hydrogen in the presence or absence of steam at 300°–450° C. and at high pressure, for example, 200 atmospheres. The products are liquid reduction and condensation products such as higher alcohols and ketones, together with small amounts of hydrocarbons, the mixture being useful as a solvent or as a fuel.

Example 6

1. 1 mol $Al_2O_3$ is dissolved in caustic soda to form sodium aluminate.

2. 1 mol of manganese in the form of potassium permanganate as a N/10 solution.

3. 6–10 mols $SiO_2$ in the form of sodium water glass is diluted with fifteen volumes of water and mixed with pulverized adsorptive carbon to form a thinly fluid paste.

Solutions 1 to 3 are poured together and heated with stirring to 60°–80° C. until a filtered sample shows no permanganate color. The gelatinous precipitate which is formed is pressed and dried and constitutes an aluminum-manganese-zeolite diluted with absorbent carbon. The zeolite is then treated to exchange part or all of the alkali metal for calcium by the use of a solution of soluble calcium salts, or the zeolite may be used to soften water at the same time effecting the introduction of calcium. The product is a very effective material for quantitatively removing iron and manganese from water. Decolorizing colloidal substances of organic or inorganic origin and absorbed in the permutit like zeolite permit the obtaining of a completely colorless purified water.

Example 7

1. 3 mols of zinc in the form of a zinc acetate solution.

2. 1 mol chromium also in the form of an acetate solution.

3. 16–20 mols potassium water glass diluted with 10–15 volumes of water mixed with five percent of glycerine.

Solutions 1 and 2 are mixed together and sufficient organic compounds such as, for example, glycerine are added so that a diluted caustic alkali solution no longer produces a precipitate. The mixed solutions 1 and 2 are then poured into 3 with agitation, the mixture is heated to 60°–80° C. and a permanganate solution added with stirring until it is no longer decolorized. A dark brown gelatinous mass is formed, pressed, dried and hydrated, and a dilute zinc nitrate solution is then permitted to trickle over the product in copious amounts, and if desired at an elevated temperature in order to effect as complete a base exchange as possible. Instead of the zinc nitrate solution a solution of cadmium nitrate, uranyl nitrate, copper nitrate, cerium nitrate, manganous nitrate, magnesium nitrate, lead nitrate and the like may be used or mixtures of these solutions may be used. After base exchange is complete, the product is given a subsequent treatment with neutral or weakly alkaline solutions of salts such as ammonium chromates, vanadates, tungstates, uranates or molybdates or ammonium permanganate in order to produce a salt-like compound with the zeolite.

The product before or after base exchange or salt formation can be used as a catalyst particularly for the synthesis of methyl alcohol for which purpose it is very advantageous to dilute the zeolite in the nascent state or after formation with suitable diluents such as kieselguhr, pumice meal, asbestos fibres, pulverized carbon, or powdered mineral which contain the components of the zeolites.

Pulverized insoluble or difficultly soluble components of the zeolites may also be used and the diluents may be catalytically active or inactive.

After a preliminary treatment with reducing gases at about 300° C., the above described zeolites are excellent catalysts for the reduction of oxides of carbon with hydrogen at 200°–500° C. at pressures of from five atmospheres up to form oxidation containing reduction products, particularly methyl alcohol and formaldehyde. The yields are excellent.

Example 8

1. 8–10 mols $SiO_2$ in the form of commercial water glass are diluted with 5 to 6 volumes of water and kieselguhr is added until the mixture just remains easily fluid.

2. 1 mol of chromium in the form of sodium chromite solution.

3. 1 mol of iron as ferous oxalate together with 2 mols of potassium oxalate is dissolved in 2 mols of concentrated caustic potash to form potassium ferro-oxalate.

Solutions 1, 2 and 3 are mixed together in any desired sequence and are stirred with warming to a 60°–80° C. accompanied by the gradual addition of about 3 mols of permanganate in aqueous solution. The heating and stirring are continued until the permanganate color disappears and the mixture solidifies to a gel. If the gelatinization is delayed, a little dilute nitric acid or electrolytes which have a salting out effect can be added. After cooling, the mass is pressed, dried and hydrated and a ferrous nitrate solution can be permitted to trickle over the product in order to partially exchange the alkali metal for iron. The resulting product contains in the nucleus iron chromium and manganese and in exchangeable form alkali metal and iron. Salt-like compounds with the zeolites can be produced by treatment with uranic acid, chromic acid or vanadic in weakly alkaline or neutral solutions. In order to increase the mechanical strength of the product, water glass can be added to the wash water.

The original zeolites as well as those which are prepared by base exchange and by the formation of salt-like compounds with acid groups are excellent catalysts for the transformation of water gas and excess steam into $CO_2$ and $H_2$ at 500°–550° C.

Instead of using kieselguhr as the sole diluent, part or all of it can be replaced by pumice meal, ground clay, burnt pyrites and ores of iron, chromium and manganese. Mixtures of two or more of these diluents may also be used.

Example 9

1. 1 mol of vanadium in the form of vanadyl sulfate is dissolved in caustic potash to form a vanadite solution.

2. 0.5 mols of copper in the form of potassium copper cyanide solution.

3. 0.5 mols nickel similarly in the form of potassium nickel cyanide solution.

4. 9 mols of $SiO_2$ in the form of dilute potassium water glass solution are diluted with generous additions of pumice meal, asbestos powder or celite.

Solutions 1, 2 and 3 are poured into 4 with vigorous agitation and gentle warming. Thereupon a rapid stream of $CO_2$ is passed through the mixture until the exit gases give no test for cyanogen. The gelatinous mass formed is pressed, dried and has excellent base exchange properties.

If the product described above is treated with a mixture of air and $SO_2$ at 450° C., in a short time an excellent contact sulfuric acid process sets in with a 96–97 conversion of $SO_2$ to $SO_3$ at the customary gas speeds.

Given the same preliminary treatment, the zeolite is also an excellent catalyst for the oxidation of organic compounds, for example, the oxidation of naphthalene in air to phthalic anhydride at 360°–550° C. whereas the known vanadium containing contact masses will not give technically satisfactory yields above 420° C. The same catalyst may also be used for the oxidation of phthalic anhydride with air at 360°–450° C. to maleic acid.

Example 10

1. 10 mols of $SiO_2$ in the form of sodium water glass are diluted with 20 volumes of water and sufficient lignite coke is stirred in to produce a mixture which is just stirrable. The mixture is then slightly acidulated with formic acid and subjected to dialysis forming a silicic acid gel diluted with coke.

2. 1 mol chromium oxide dissolved in the form of an acetate is treated with glycerine until the addition of alkali no longer produces a precipitate. The glycerine chromium complex is then stirred into the dialyzed silicic acid diluted with coke, whereupon 2 mols of concentrated caustic soda are added, the mixture heated and a stream of chlorine gas diluted with air passed through with vigorous agitation. The black gelatinous body produced is freed from excess liquid by pressing and is then washed and dried. The dried mass is broken into fragments over which generous quantities of ammonium carbonate solution is permitted to trickle, replacing the alkali metal of the zeolite by ammonium.

The ammonium chrome zeolite diluted with coke is an excellent gas purifier and can be used to free gases from sulphur in organic or inorganic form and from volatile metal compounds. It is frequently advantageous to add a small amount of halogen or oxygen to the gases to be purified.

Example 11

1. 8 mols of $SiO_2$ in the form of potassium water glass are diluted with 7 to 8 volumes of water and sufficiently freshly precipitated thorium oxide, titanium oxide or zirconium oxide is stirred in to produce a thinly fluid suspension.

2. 1 mol of beryllium oxide is dissolved to form sodium beryllate.

3. 1 mol of zinc is dissolved in the form of the potassium zinc cyanide.

Solutions 1 and 2 are mixed together and then added to solution 3. The mixture is heated to 60°–80° C. and a potassium-zinc-beryllium zeolite precipitates out in a short time. The zeolite contains thorium titanium or zirconium oxides or mixtures of them as diluents. Excess water is poured off and the product is dried.

The zeolite, above described, when used in a deep contact layer gives excellent yields of aldol and crotonaldehyde when acetaldehyde vapors are passed over the catalyst in a slow stream. The aldol condensation can also be effected by contact with the catalyst in the the liquid phase.

It will be seen from the above examples which are only a few illustrations of some of the possible combinations which embody the features of the present invention, that a large and varied field of zeolite products is made available to the zeolite chemist by the present invention. The examples can do no more than describe a few typical individuals and it should be clearly understood that the invention is in no sense limited thereby. On the contrary, the features and the advantages of the present invention can be used to prepare new or old zeolites of the most diverse character, many of which are of great importance as catalysts for vapor, liquid and solid phase catalyses and for the purification of gases.

The expression "zeolite bodies" as used in the claims includes not only the base exchanging complex bodies which are polysilicates or alumino silicates or analogues but includes in addition the dehydration and salt-like products of the zeolites, which possess very many similarities both chemical and physical with readily base exchanging bodies commonly referred to as zeolites.

What we claim is:

1. Zeolite bodies containing at least one complex basic compound in non-exchangeable form.

2. Zeolite bodies containing at least one catalytically active complex basic compound in non-exchangeable form.

3. Zeolite bodies containing at least one complex basic compound in non-exchangeable form and containing at least one nuclear acid component other than $SiO_2$.

4. Zeolite bodies containing at least one catalytically active complex basic compound in non-exchangeable form and containing at least one nuclear acid component other than $SiO_2$.

5. Zeolite bodies containing at least one complex basic compound in non-exchangeable form and containing exchangeable bases other than alkali metals.

6. Zeolites containing at least one complex basic compound in non-exchangeable form and combined with an acid radical to form a salt-like body.

7. Zeolites containing at least one complex basic compound in non-exchangeable form and containing diluents, the diluents and the zeolites forming a homogeneous structure.

8. Zeolite bodies containing in non-exchangeable form complex compounds of bases which do not form alkali soluble compounds.

9. Zeolite bodies containing non-exchangeable bases which have been introduced in the form of decomposible compounds at least part of which have been decomposed subsequent to zeolite formation, the products of the zeolite bodies to be characterized by extreme porosity and fineness of structure.

10. The process of forming zeolite bodies which comprises causing base components in the form of decomposible compounds to react with nuclear acid forming components under conditions to produce a zeolite.

11. The process of producing zeolite bodies containing in non-exchangeable form bases which do not form alkali soluble simple compounds which comprises causing alkali soluble complex compounds of the base to react with nuclear acid forming components under conditions of zeolite formation.

12. The method of preparing zeolite bodies containing in non-exchangeable form bases which do not form alkali soluble compounds in the state of oxidation in which they are to be present in the zeolite bodies, which comprises causing alkali soluble compounds of the bases at valences different from that desired in the zeolite bodies to react with nuclear acid forming components under conditions of zeolite formation and effecting change of valences.

13. The method of preparing zeolite bodies containing in non-exchangeable form bases which do not form alkali soluble compounds at the valence desired which comprises causing alkali soluble compounds of a higher valence of the base to react with nuclear acid forming components under conditions of zeolite formation and effecting reduction or oxidation of the bases to the desired valence.

14. The method of preparing zeolite bodies which comprises causing a complex compound of a base to react with nuclear acid forming components under conditions of zeolite formation and decomposing at least part of the complex compound.

15. The process according to claim 14 in which the decomposition takes place after zeolite formation.

16. The process according to claim 14 in which the decomposition is effected by reagents which introduce components into the zeolite bodies.

17. The method of preparing zeolite bodies which comprises causing an alkali soluble compound of the base to react with nuclear acid forming components under conditions of zeolite formation and changing the valence of at least part of the base during zeolite formation.

18. The method of preparing zeolite bodies which comprises causing an alkali soluble compound of the base to react with nuclear acid forming components under conditions of zeolite formation and changing the valence of at least part of the base after zeolite formation.

19. The method of preparing zeolite bodies which comprises causing an alkali soluble compound of the base to react with nuclear acid forming components under conditions of zeolite formation and changing the valance of at least part of the base, the valence changing being effected by the addition of a valence changing agent which does not form a component of the zeolite, during zeolite formation.

20. The method of preparing zeolite bodies which comprises causing an alkali soluble compound of the base to react with nuclear acid forming components under conditions of zeolite formation and changing the valence of at least part of the base during zeolite formation, the valence change being effected by a zeolite component.

21. The method of preparing zeolite bodies which comprises causing an alkali soluble compound of the base to react with nuclear acid forming components under conditions of zeolite formation and changing the valence of at least part of the base during zeolite formation, the valence change being effected by means of at least one of the nuclear base components of the zeolite bodies.

22. The method of preparing zeolite bodies which comprises causing a complex compound of a base to react with nuclear acid forming components under conditions of zeolite formation, and decomposing at least a part of the complex compound by transforming it into a compound of lower degree of dissociation and eliminating this latter compound.

23. The method of preparing zeolite bodies which comprises causing a complex compound of a base to react with nuclear acid forming components under conditions of zeolite formation, and increasing the mechanical strength of the product by washing with a solution of a soluble silicate.

24. The method of preparing zeolite bodies which comprises causing a complex compound of a base to react with nuclear acid forming components under conditions of zeolite formation, decomposing at least a portion of the complex compound and increasing the mechanical strength of the product by washing with a solution of a soluble silicate.

25. The method of preparing zeolite bodies which comprises causing a complex compound of a base to react with nuclear acid forming components under conditions of zeolite formation, and accelerating a precipitation by the addition of chemical precipitates.

26. The method according to claim 25 in which the precipitants are acid.

27. The method according to claim 25 in which the precipitants include liquids.

28. The method according to claim 25 in which the precipitants include gases.

29. The method of preparing zeolite bodies which comprises causing a complex compound of a base to react with nuclear acid forming components under conditions of zeolite formation and under physical conditions which accelerate precipitation.

30. Zeolite bodies containing at least one catalytically activating complex basic compound in non-exchangeable form.

31. Catalytically active zeolite bodies containing complex basic compounds in non-exchangeable form, at least one complex basic compound being a catalytic activator for at least one catalytically active component of the zeolite.

32. Zeolites according to claim 3 in which at least one of the nuclear acid components other than $SiO_2$ is catalytically active.

33. Catalytically active zeolite bodies containing at least one complex basic compound in non-exchangeable form and containing at least one nuclear acid component other than $SiO_2$ which is a catalytic activator for at least one of the catalytically active components of the zeolite bodies.

34. Zeolite bodies containing at least one complex basic compound in non-exchangeable form and containing at least one exchangeable base other than an alkaline metal which is catalytically active.

35. Catalytically active zeolite bodies containing at least one complex basic compound in non-exchangeable form and containing at least one exchangeable base which is an activator for at least one of the catalytically active components of the zeolite bodies.

36. Zeolites containing at least one catalytically active complex basic compound in non-exchangeable form and being combined with at least one catalytically active acid radical to form salt-like bodies.

37. Catalytically active zeolites containing at least one complex basic compound in non-exchangeable form combined with at least one acid radical which is an activator for at least one of the catalytically active components of the zeolite to form a salt-like body.

38. Zeolites containing at least one complex basic compound in non-exchangeable form and being combined with diluents to form a homogeneous structure, at least one of the diluents being catalytically active.

39. Catalytically active zeolites containing at least one complex basic compound in non-exchangeable form and containing diluents which form with the zeolite a homogeneous structure, at least one of the diluents being an activator for at least one of the catalytically active components of the zeolite.

40. Catalytically active zeolite bodies containing at least one complex basic compound in non-exchangeable form and containing catalytically active diluents, at least one of the components of the zeolite being an activator for at least one of the catalytically active diluents.

Signed at St. Louis, Mo., this 2nd day of April, 1926.

ALPHONS O. JAEGER.
JOHANN A. BERTSCH.